(12) United States Patent
Mori

(10) Patent No.: US 12,686,075 B2
(45) Date of Patent: ***Jul. 21, 2026

(54) LASER PROCESSING METHOD, LASER PROCESSING APPARATUS, AND OUTPUT CONTROL DEVICE OF LASER PROCESSING APPARATUS

(71) Applicant: Panasonic Intellectual Property Management Co., Ltd., Osaka (JP)

(72) Inventor: Masahiro Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 955 days.

This patent is subject to a terminal disclaimer.

(21) Appl. No.: 17/903,573

(22) Filed: Sep. 6, 2022

(65) Prior Publication Data

US 2022/0410306 A1      Dec. 29, 2022

Related U.S. Application Data

(63) Continuation of application No. 16/951,600, filed on Nov. 18, 2020, now Pat. No. 11,465,231.

(30) Foreign Application Priority Data

Jan. 28, 2020      (JP) ................................. 2020-012030

(51) Int. Cl.
*B23K 26/60* (2014.01)
*B23K 26/00* (2014.01)
(Continued)

(52) U.S. Cl.
CPC ........ *B23K 26/0006* (2013.01); *B23K 26/032* (2013.01); *B23K 26/0626* (2013.01);
(Continued)

(58) Field of Classification Search
CPC . G06T 2207/30164; G06T 2207/30136; G06T 7/0004; B23K 2103/12;
(Continued)

(56) References Cited

U.S. PATENT DOCUMENTS 4,857,699 A      8/1989 Duley et al.
4,877,939 A   *   10/1989 Duley ................. B23Q 35/128
219/121.84
(Continued)

FOREIGN PATENT DOCUMENTS

JP          63-295093          12/1988
JP          2002-316282          10/2002
(Continued)

*Primary Examiner* — Jimmy Chou
(74) *Attorney, Agent, or Firm* — Wenderoth, Lind & Ponack, L.L.P.

(57) ABSTRACT

A laser processing apparatus of the present disclosure controls outputs of a blue laser oscillator and an infrared laser oscillator such that before a surface melting is detected on a workpiece, the workpiece is irradiated with at least blue laser light, and after the surface melting is detected on the workpiece, a power of infrared laser light with which the workpiece is irradiated is increased as compared to before the surface melting is detected.

11 Claims, 2 Drawing Sheets

(51) Int. Cl.

| | | |
|---|---|---|
| *B23K 26/03* | (2006.01) | |
| *B23K 26/062* | (2014.01) | |
| *G06T 7/00* | (2017.01) | |
| *B23K 103/10* | (2006.01) | |
| *B23K 103/12* | (2006.01) | |

(52) U.S. Cl.
CPC ............ B23K 26/60 (2015.10); G06T 7/0004 (2013.01); *B23K 2103/10* (2018.08); *B23K 2103/12* (2018.08); *G06T 2207/30136* (2013.01); *G06T 2207/30164* (2013.01)

(58) Field of Classification Search
CPC ............ B23K 2103/10; B23K 26/0626; B23K 26/032; B23K 26/60; B23K 26/0006
USPC .................................................... 219/121.62
See application file for complete search history.

(56) References Cited

U.S. PATENT DOCUMENTS

| | | | | |
|---|---|---|---|---|
| 4,879,449 A | | 11/1989 | Duley et al. | |
| 4,891,491 A | | 1/1990 | Duley et al. | |
| 5,272,309 A | * | 12/1993 | Goruganthu | B23K 26/0613 |
| | | | | 219/121.64 |
| 5,272,312 A | | 12/1993 | Jurca | |
| 5,340,975 A | * | 8/1994 | Vogelgesang | H04N 1/40031 |
| | | | | 219/121.62 |
| 5,874,708 A | | 2/1999 | Kinsman | |
| 6,433,306 B1 | * | 8/2002 | Grubb | H01S 3/0057 |
| | | | | 219/121.73 |
| 7,094,988 B1 | * | 8/2006 | Taylor | B23K 26/144 |
| | | | | 219/121.64 |
| 2005/0282364 A1 | * | 12/2005 | Seki | B23K 26/03 |
| | | | | 438/149 |
| 2007/0215575 A1 | | 9/2007 | Gu | |
| 2008/0223831 A1 | * | 9/2008 | Yoshikawa | B23K 26/0884 |
| | | | | 219/121.64 |
| 2008/0296272 A1 | | 12/2008 | Lei | |
| 2009/0007933 A1 | | 1/2009 | Thomas | |
| 2011/0222574 A1 | | 9/2011 | Chann | |
| 2012/0013699 A1 | * | 1/2012 | Ueta | B41M 5/267 |
| | | | | 347/225 |
| 2012/0055909 A1 | | 3/2012 | Miyake et al. | |
| 2012/0180527 A1 | | 7/2012 | Caird | |
| 2012/0234810 A1 | | 9/2012 | Kudo | |
| 2014/0265047 A1 | | 9/2014 | Burris | |
| 2015/0246848 A1 | | 9/2015 | Ikenoue | |
| 2015/0273624 A1 | * | 10/2015 | Yoshida | C03B 23/203 |
| | | | | 428/209 |
| 2015/0375456 A1 | | 12/2015 | Cheverton | |
| 2016/0067827 A1 | | 3/2016 | Zediker | |
| 2018/0185959 A1 | | 7/2018 | Mathews, Jr. | |
| 2018/0185963 A1 | | 7/2018 | Ostroverkhov | |
| 2018/0207750 A1 | | 7/2018 | Carter | |
| 2019/0047090 A1 | | 2/2019 | Suwa | |
| 2019/0389001 A1 | | 12/2019 | Yasucka | |
| 2020/0055132 A1 | | 2/2020 | Ding | |
| 2020/0075338 A1 | | 3/2020 | Lee | |
| 2020/0324463 A1 | | 10/2020 | Morgan | |
| 2021/0013070 A1 | * | 1/2021 | Reed | H10P 34/42 |
| 2021/0178512 A1 | | 6/2021 | Nomaru | |
| 2021/0370409 A1 | | 12/2021 | Takushima | |

FOREIGN PATENT DOCUMENTS

| | | | | |
|---|---|---|---|---|
| JP | 2004-58140 | 2/2004 | | |
| JP | 2006-5148 | 1/2006 | | |
| JP | 2010-125502 | 6/2010 | | |
| WO | 2010/131298 | 11/2010 | | |
| WO | WO-2019183445 A1 | * | 9/2019 | ........ B23K 26/0624 |

\* cited by examiner

FIG. 2

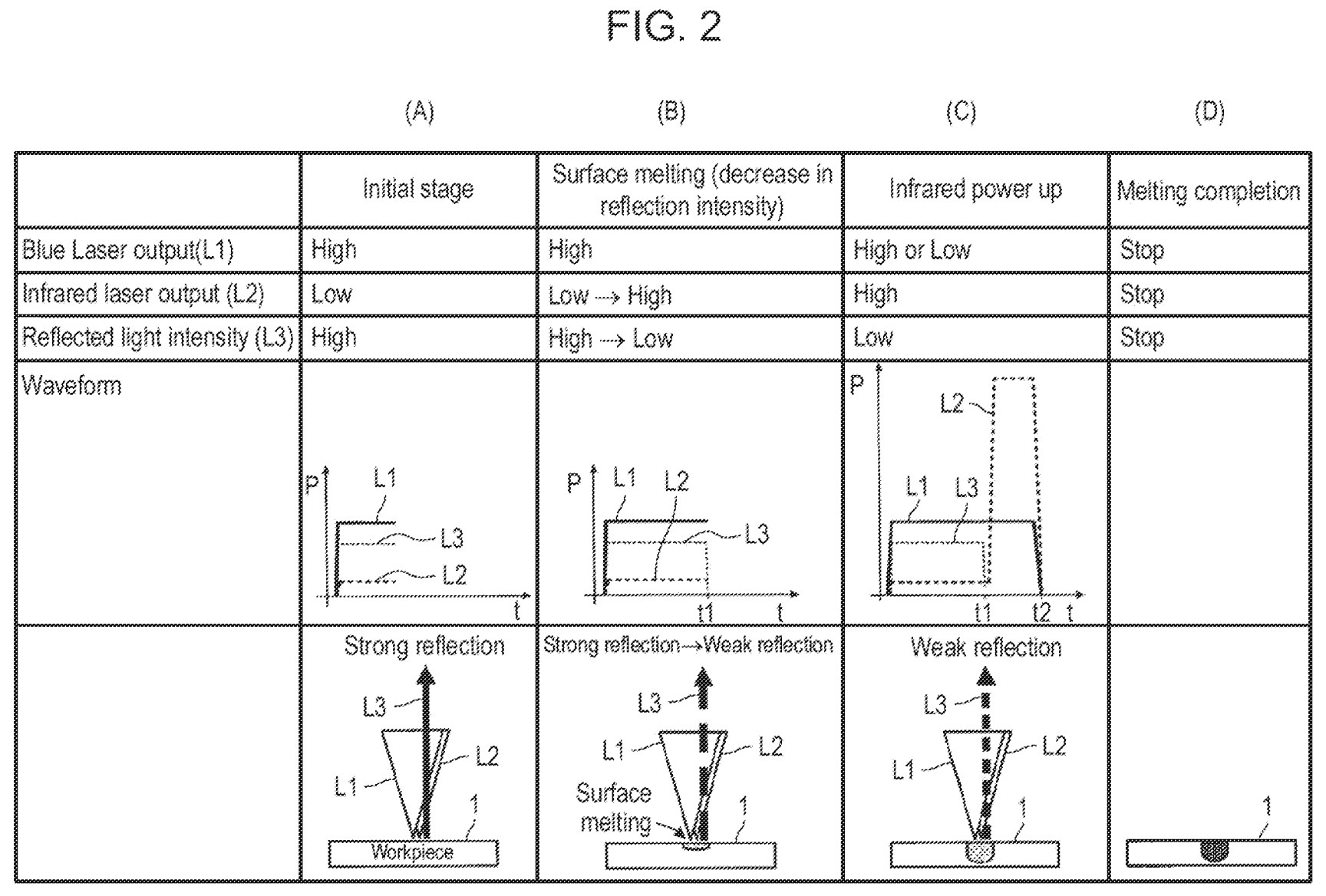

| | (A) Initial stage | (B) Surface melting (decrease in reflection intensity) | (C) Infrared power up | (D) Melting completion |
|---|---|---|---|---|
| Blue Laser output(L1) | High | High | High or Low | Stop |
| Infrared laser output (L2) | Low | Low → High | High | Stop |
| Reflected light intensity (L3) | High | High → Low | Low | Stop |
| Waveform | Strong reflection | Strong reflection→Weak reflection / Surface melting | Weak reflection | |

LASER PROCESSING METHOD, LASER PROCESSING APPARATUS, AND OUTPUT CONTROL DEVICE OF LASER PROCESSING APPARATUS

BACKGROUND

1. Technical Field

The present disclosure relates to a laser processing method, a laser processing apparatus, and an output control device of the laser processing apparatus.

2. Description of the Related Art

A laser processing apparatus is widely used for various processing such as micro-processing, welding, marking, or cutting. Since the laser processing apparatus locally collects energy of laser beam and irradiates a workpiece with laser light having high energy density, high definition processing can be realized at high speed.

The laser light has a drawback that it has a poor absorption rate (in other words, has a high reflectance) for copper, aluminum, an aluminum alloy, or the like, which is the workpiece. As a result, it is necessary to irradiate the workpiece with laser light having a high power.

On the other hand, a workpiece such as copper, aluminum, or aluminum alloy has characteristics that once the workpiece melts, the reflectance of the workpiece with respect to the laser light decreases, and the absorption rate increases. Focusing on this point, in the related art, a technique for rapidly transitioning a surface of the workpiece to a melting state has been developed.

For example, in Japanese Patent Unexamined Publication No. 2002-316282, in an initial processing stage of a workpiece, a technique for accelerating a surface melting of a workpiece by irradiating the workpiece with pulse laser light having a high power in addition to semiconductor laser light having a low power is disclosed.

When a laser processing method of Japanese Patent Unexamined Publication No. 2002-316282 is used, the melting of the workpiece is accelerated and the surface of the workpiece can be quickly transferred to the melting state but there is a possibility that spatter, voids, or the like may be generated because a keyhole is formed in a laser irradiation portion of the workpiece by the pulsed laser light having a high power.

The inventor of the present disclosure considered using laser light having different wavelengths, more specifically, both blue laser light and infrared laser light for laser processing. A wavelength of the blue laser light is 380 to 500 [nm], and a wavelength of the infrared laser light is 700 to 1100 [nm]. The blue laser light has a feature of a high absorption rate into a workpiece, and the infrared laser light has a feature of a good beam quality (beam parameter products (BPP) or M square (M2) are small).

With respect to the workpiece such as copper, aluminum, or an aluminum alloy, the infrared laser light has a drawback that the absorption rate is low in an initial processing stage before a surface melting of the workpiece. To compensate for this, it is conceivable to irradiate the workpiece with the infrared laser light having a high power before the surface melting to accelerate the melting but in this way, a rapid temperature rise occurs when a solid and liquid phase of the workpiece changes, so that the melting becomes unstable and the spatter or recessed holes are generated.

In contrast to this, with respect to the workpiece such as copper, aluminum, or an aluminum alloy, the blue laser light has an advantage that the absorption rate is higher than that of the infrared laser light in the initial processing stage before the surface melting of the workpiece. Therefore, when the blue laser light is used, the melting state can be formed with a lower power than that of the infrared laser light, so that the melting state can be stabilized and the generation of the spatter and recessed holes can be suppressed.

However, it is difficult to realize a laser apparatus for generating blue laser light having a high power. As a result, when a blue laser is used, even after the melting of the workpiece, it is necessary to irradiate the workpiece with the blue laser light having a low power, and it is difficult to secure a sufficient melt volume in the workpiece.

SUMMARY

The present invention has been made in consideration of the above points and provides a laser processing method, a laser processing apparatus, and an output control device for the laser processing apparatus capable of performing laser processing with high quality and high speed.

According to an aspect of the present disclosure, a laser processing method includes a first irradiation step of irradiating a workpiece with at least blue laser light at an initial processing stage before a surface melting of the workpiece; a melting detection step of detecting the surface melting of the workpiece; and a second irradiation step of irradiating, after the surface melting is detected, the workpiece with infrared laser light having a power higher than a power before the surface melting is detected.

According to another aspect of the present disclosure, a laser processing apparatus includes a laser light former (laser) that forms blue laser light and infrared laser light with which a workpiece is irradiated; a melting detector that detects a surface melting of the workpiece; and an output controller that controls a power of the blue laser light and a power of the infrared laser light output by the laser light former. The output controller causes the laser light former, before the surface melting is detected on the workpiece, to irradiate the workpiece with at least the blue laser light, and after the surface melting is detected on the workpiece, to increase the power of the infrared laser light with which the workpiece is irradiated as compared to before the surface melting is detected.

According to still another aspect of the present disclosure, an output control device of a laser processing apparatus includes an output controller that controls a power of laser light with which a workpiece is irradiated; and a melting detector that detects a surface melting of the workpiece. The output controller controls a power of laser light, before the surface melting is detected on the workpiece, to irradiate the workpiece with at least blue laser light, and after the surface melting is detected on the workpiece, to increase a power of infrared laser light with which the workpiece is irradiated as compared to before the surface melting is detected.

BRIEF DESCRIPTION OF THE DRAWINGS

FIG. 2 is a diagram provided for explaining an operation of the laser processing apparatus of the exemplary embodiment.

DETAILED DESCRIPTION

Figure 1:
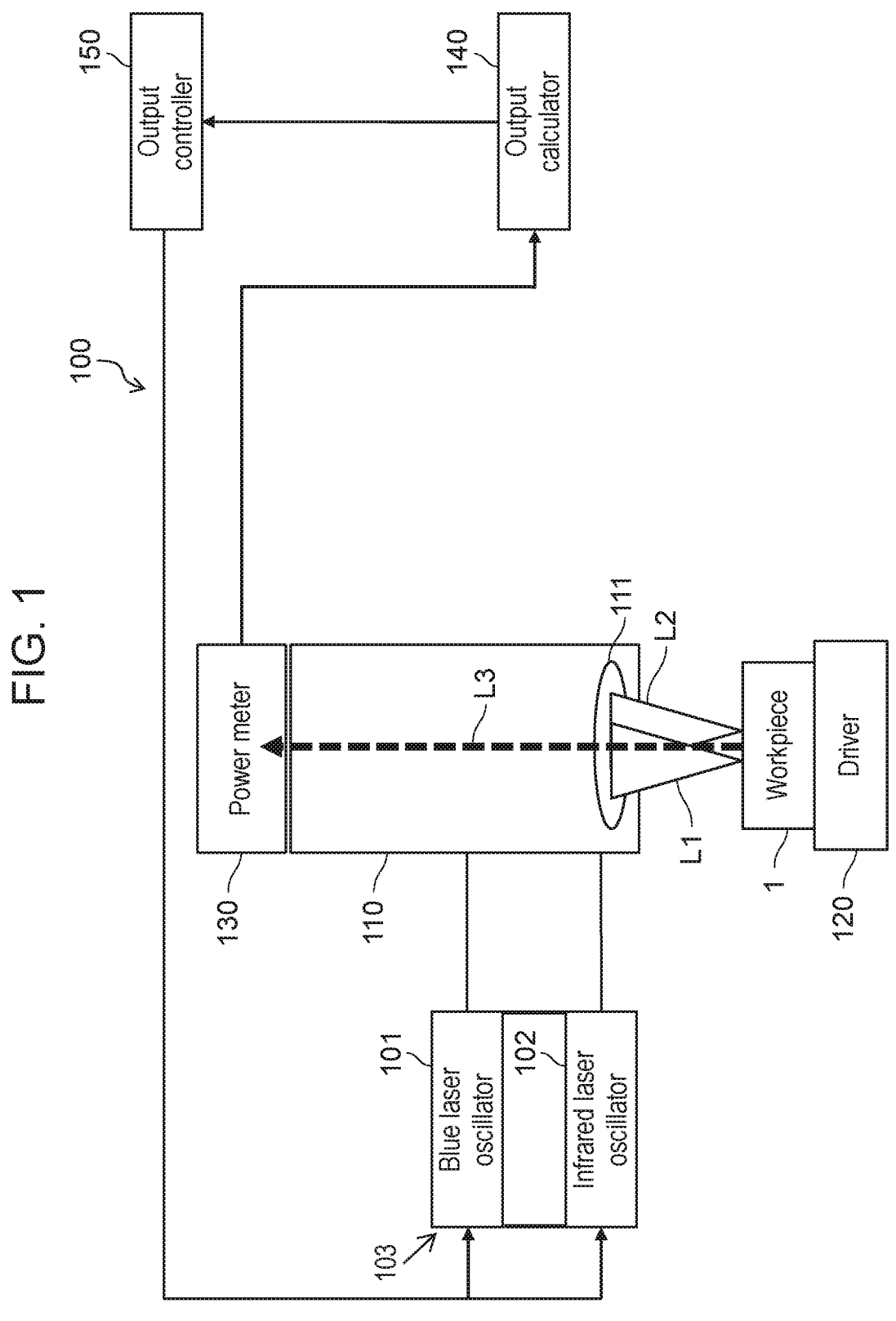
FIG. 1 is a schematic diagram illustrating a main configuration of a laser processing apparatus according to an exemplary embodiment.

The present inventor has considered that laser processing with high quality and high speed could be realized by using both blue laser light and infrared laser light and appropriately selecting the irradiation timing thereof, and accordingly the present invention has come to be made.

One of the features of the laser processing method and apparatus of the present disclosure is that at the initial processing stage before the surface melting of the workpiece, the workpiece is irradiated with at least the blue laser light. After the surface melting of the workpiece is detected, the workpiece is irradiated with the infrared laser light having a power higher than the power before the surface melting is detected.

<2> Exemplary Embodiment

Hereinafter, an exemplary embodiment of the present disclosure will be described with reference to the drawings.

FIG. 1 is a schematic diagram illustrating a main configuration of laser processing apparatus 100 according to the exemplary embodiment of the present disclosure.

Laser processing apparatus 100 includes a laser 103 having a blue laser oscillator 101, infrared laser oscillator 102, and the laser processing apparatus also includes laser head 110, driver 120, power meter 130, output calculator 140, and output controller 150.

Blue laser light obtained by blue laser oscillator 101 and infrared laser light obtained by infrared laser oscillator 102 are incident on laser head 110.

Laser head 110 has condenser lens 111. A surface of workpiece 1 is irradiated with blue laser light L1 and infrared laser light L2, which are incident on laser head 110, by condenser lens 111.

Although blue laser light L1 and infrared laser light L2 are described so as to be shifted from each other in FIG. 1 for convenience, the same point on workpiece 1 is irradiated with blue laser light L1 and infrared laser light L2. For example, blue laser light L1 and infrared laser light L2, which are guided by laser head 110, are superimposed inside laser head 110 by a wavelength synthesis method (not illustrated) such as a dichroic mirror or a prism, and the same point on workpiece 1 is irradiated with blue laser light L1 and infrared laser light L2. When a laser irradiation is performed together with a scanning, blue laser light L1 may be preceded first and a position shifted to a rear side of the scanning from blue laser light L1 may be irradiated with infrared laser light L2.

Driver 120 moves workpiece 1 in a direction along a plane orthogonal to an optical axis of laser light L1.

Power meter 130 measures the power of the reflected light from workpiece 1. In the case of the present exemplary embodiment, the power of reflected light L3 of infrared laser light L2 from workpiece 1 is measured.

Output calculator 140 obtains a power to be output from blue laser oscillator 101 and infrared laser oscillator 102 by a calculation based on a measurement result of power meter 130.

Output controller 150 transmits an output control signal to blue laser oscillator 101 and infrared laser oscillator 102 based on a calculation result of output calculator 140.

FIG. 2 is a diagram provided for explaining an operation of laser processing apparatus 100 of the present exemplary embodiment.

First, as illustrated in (A) of FIG. 2, at the initial processing stage before the surface melting of workpiece 1, laser processing apparatus 100 irradiates workpiece 1 with blue laser light L1 and infrared laser light L2. At this time, blue laser light L1 is controlled with a high power, and infrared laser light L2 is controlled with a low power. However, as described above, although blue laser light L1 has a high power, it has a very low power as compared with the high power of infrared laser light L2 (see (C) of FIG. 2).

In the state in (A) of FIG. 2, the surface melting is accelerated by blue laser light L1 having a high absorption rate with respect to workpiece 1 such as copper or aluminum alloy. In (A) of FIG. 2, since the surface of workpiece 1 is before melting, reflected light L3 having a high power is measured by power meter 130.

Eventually, as illustrated in (B) of FIG. 2, when the surface of workpiece 1 melts, since the absorption rate of infrared laser light L2 on the surface of workpiece 1 increases and the reflectance decreases, the power of reflected light L3 decreases (time t1). When such a decrease in the power of reflected light L3 is detected, laser processing apparatus 100 transitions to the state illustrated in (C) of FIG. 2.

As illustrated in (C) of FIG. 2, after time t1 when the decrease in the power of reflected light L3 is detected (that is, after the surface melting is detected), laser processing apparatus 100 increases the power of infrared laser light L2. In this way, after the surface melting of workpiece 1, the laser processing that secures a sufficient melt volume can be performed by infrared laser light L2 having a high power. Incidentally, blue laser light L1 after the surface melting is detected may be controlled with the high power as illustrated in the example of FIG. 2, or may be controlled with the low power (i.e., the power may be lowered as compared to (A) and (B)).

Eventually, when the desired melting with respect to workpiece 1 is completed at time t2, as illustrated in (D) of FIG. 2, laser processing apparatus 100 stops outputs of blue laser light L1 and infrared laser light L2 from blue laser oscillator 101 and infrared laser oscillator 102.

As described above, according to laser processing apparatus 100 of the present exemplary embodiment, at the initial processing stage before the surface melting of workpiece 1, workpiece 1 is irradiated with at least blue laser light L1, and after the surface melting of workpiece 1 is detected, workpiece 1 is irradiated with infrared laser light L2 having a power higher than the power before the surface melting is detected.

In this way, the surface melting of workpiece 1 is accelerated by blue laser light L1 having a high absorption rate into workpiece 1, and after the surface melting is detected since the melt volume is secured by infrared laser light L2 having a high power, the laser processing with high quality and high speed can be performed.

<3> Other Exemplary Embodiments

The above-described exemplary embodiment is merely an example of the exemplary embodiment of the present disclosure, and the technical scope of the present disclosure should not be construed in a limited manner by this description. That is, the present disclosure can be implemented in various forms without departing from its gist or its main features.

In the above-described exemplary embodiment, at the initial processing stage before the surface melting of workpiece 1, the case where workpiece 1 is irradiated with infrared laser light L2 in addition to blue laser light L1 has been described but at the initial processing stage, it is not always necessary to irradiate workpiece 1 with infrared laser light L2. Instead of infrared laser light L2, another reference light capable of detecting the surface melting may be used for irradiating. A capture unit that images the surface of workpiece 1 may be provided, and the surface melting of workpiece 1 may be detected based on a captured image of the capture unit. In short, it suffices when the surface melting of workpiece 1 can be detected.

However, in a case where infrared laser light L2 having a low power is used for a melting detection as in the above-described exemplary embodiment, when workpiece 1 is irradiated with infrared laser light L2 having a high power after the surface melting is detected, infrared laser light L2 rises faster and there is an advantage that the processing accuracy is improved.

It is more desirable that blue laser light L1 after the surface melting is detected is controlled to increase or decrease depending on a surface melting state detected by the melting detection. For example, when the power of blue laser light L1 after the surface melting is adjusted based on an amount of change in a level of reflected light L3 of infrared laser light L2 (=the speed of growth of the initial melting), the melting after the surface melting can be made more stable. For example, when the amount of change in reflected light L3 is large, that is, when the initial melting progresses rapidly, there is a possibility that spatter or voids may be generated due to blue laser light L1. Therefore, in such a case, it is desirable to maintain a good amount of change and stabilize the quality by lowering the power of blue laser light L1. On the contrary, when the amount of change in reflected light 143 is small, the initial melting may be insufficient, so it is desirable to increase the power of blue laser light L1.

<4> Round-Up

One aspect of a laser processing method of the present disclosure includes: a first irradiation step of irradiating a workpiece with at least blue laser light at an initial processing stage before a surface melting of the workpiece; a melting detection step of detecting the surface melting of the workpiece; and a second irradiation step of irradiating, after the surface melting is detected, the workpiece with infrared laser light having a power higher than a power (including 0) before the surface melting is detected.

In one aspect of the laser processing method of the present disclosure, in the first irradiation step, the workpiece is irradiated with infrared laser light having a power lower than a predetermined threshold value in addition to the blue laser light, in the melting detection step, the surface melting is detected based on reflected light of the infrared laser light having a power lower than the predetermined threshold value from the workpiece, and in the second irradiation step, the workpiece is irradiated with the infrared laser light having a power higher than or equal to the predetermined threshold value.

In one aspect of the laser processing method of the present disclosure, in the first irradiation step, the workpiece is irradiated with the infrared laser light in addition to the blue laser light, and in the second irradiation step, the workpiece is irradiated with the blue laser light in addition to the infrared laser light having a power higher than the power in the first irradiation step, and a power of the blue laser light with which the workpiece is irradiated in the second irradiation step is controlled to increase or decrease depending on a surface melting state detected in the melting detection step.

One aspect of a laser processing apparatus of the present disclosure includes: a laser light former (i.e., a 'laser' 103 which includes blue laser oscillator 101 and infrared laser oscillator 102) that forms both blue laser light L1 and infrared laser light L2 with which workpiece 1 is irradiated; a melting detector (power meter 130) that detects a surface melting of workpiece 1; and an output controller (output calculator 140, output controller 150) that controls a power of blue laser light L1 and infrared laser light L2 output by the laser 103 (which includes the blue laser oscillator 101 and infrared laser oscillator 102), in which the output controller (output calculator 140, output controller 150) controls an output of the laser 103 (including blue laser oscillator 101, infrared laser oscillator 102) such that before the surface melting is detected on workpiece 1, workpiece 1 is irradiated with at least blue laser light L1, and after the surface melting is detected on workpiece 1, a power of infrared laser light L2 with which workpiece 1 is irradiated is increased as compared to before the surface melting is detected.

In one aspect of the laser processing apparatus of the present disclosure, the output controller (output calculator 140, output controller 150) controls the output of the laser 103 including blue laser oscillator 101, and infrared laser oscillator 102) such that before the surface melting is detected on workpiece 1, workpiece 1 is irradiated with infrared laser light L2 having a power lower than a predetermined threshold value in addition to blue laser light L1, and after the surface melting is detected on workpiece 1, workpiece 1 is irradiated with infrared laser light L2 having a power higher than or equal to the predetermined threshold value.

In one aspect of the laser processing apparatus of the present disclosure, the output controller (output calculator 140, output controller 150) controls the output of the laser 103 (blue laser oscillator 101, infrared laser oscillator 102) such that before the surface melting is detected on workpiece 1, workpiece 1 is irradiated with infrared laser light L2 having a power lower than the predetermined threshold value in addition to blue laser light L1, after the surface melting is detected on workpiece 1, workpiece 1 is irradiated with blue laser light L1 in addition to infrared laser light L2 having a power higher than or equal to the predetermined threshold value, and a power of blue laser light L1, with which workpiece 1 is irradiated after the surface melting is detected on workpiece 1, increases or decreases depending on a surface melting state detected by the melting detector (power meter 130).

In one aspect of the laser processing apparatus of the present disclosure, the melting detector has a light detector (power meter 130) that detects an amount of reflected light reflected from workpiece 1 and detects the surface melting of workpiece 1 based on a power of reflected light L3 of infrared laser light L2, with which workpiece 1 is irradiated before the surface melting of workpiece 1, having the power lower than the predetermined threshold value from workpiece 1.

In one aspect of the laser processing apparatus of the present disclosure, the melting detector has a capture unit that images a surface of workpiece 1 and detects the surface melting of workpiece 1 based on a captured image of the capture unit.

One aspect of an output control device of a laser processing apparatus of the present disclosure includes: an output controller (output calculator 140, output controller 150) that controls a power of laser light with which workpiece 1 is irradiated; and a melting detector (power meter 130) that detects a surface melting of workpiece 1, in which the output controller (output calculator 140, output controller 150) controls a power of laser light L1 and 12 such that before the surface melting is detected on workpiece 1, workpiece 1 is irradiated with at least blue laser light L1, and after the surface melting is detected on workpiece 1, a power of infrared laser light 12 with which workpiece 1 is irradiated is increased as compared to before the surface melting is detected.

In one aspect of the output control device of a laser processing apparatus of the present disclosure, the output controller (output calculator 140, output controller 150) controls a power of laser light L1 and 12 such that before the surface melting is detected on workpiece 1, workpiece 1 is irradiated with infrared laser light 12 having a power lower than a predetermined threshold value in addition to blue laser light L1, and after the surface melting is detected on workpiece 1, workpiece 1 is irradiated with infrared laser light 12 having a power higher than or equal to the predetermined threshold value.

In one aspect of the output control device of the laser processing apparatus of the present disclosure, the output controller (output calculator 140, output controller 150) controls a power of laser light L1 and L2 such that before the surface melting is detected on workpiece 1, workpiece 1 is irradiated with infrared laser light L2 having a power lower than the predetermined threshold value in addition to blue laser light L1, after the surface melting is detected on workpiece 1, workpiece 1 is irradiated with blue laser light L1 in addition to infrared laser light L2 having a power higher than or equal to the predetermined threshold value, and a power of blue laser light L1, with which workpiece 1 is irradiated after the surface melting is detected on workpiece 1, increases or decreases depending on a surface melting state detected by the melting detector (power meter 130).

In one aspect of the output control device of the laser processing apparatus of the present disclosure, the melting detector has a light detector (power meter 130) that detects an amount of reflected light reflected from workpiece 1 and detects the surface melting of workpiece 1 based on a power of reflected light L3 of infrared laser light L2, with which workpiece 1 is irradiated before the surface melting of workpiece 1, having the power lower than the predetermined threshold value from workpiece 1.

In one aspect of the output control device of the laser processing apparatus of the present disclosure, the melting detector has a capture unit that images a surface of workpiece 1 and detects the surface melting of workpiece 1 based on a captured image of the capture unit.

According to the present disclosure, laser processing with high quality and high speed can be performed.

The present disclosure has an effect that laser processing with high quality and high speed can be performed, and is widely applicable to a laser processing method, a laser processing apparatus, and an output control device of a laser processing apparatus which perform welding, cutting, or the like.

The invention claimed is:

1. A laser processing apparatus comprising:
   a laser configured to form blue laser light and infrared laser light to irradiate a workpiece; and
   an output controller configured to control a power of the blue laser light and a power of the infrared laser light output by the laser, the output controller being further configured to control the laser to:
      before a surface of the workpiece begins to melt, irradiate the workpiece with the blue laser light to initiate surface melting of the workpiece, and

after the surface of the workpiece begins to melt, increase a power of the infrared laser light irradiating the workpiece to a level higher than a level of a power of the infrared laser light before the surface of the workpiece began to melt.

2. The laser processing apparatus of claim 1, wherein the output controller is further configured to cause the laser to:
   before the surface of the workpiece begins to melt, irradiate the workpiece with the infrared laser light having a power lower than a predetermined threshold value in addition to irradiating the workpiece with the blue laser light, and
   after the surface of the workpiece begins to melt, irradiate the workpiece with the infrared laser light having a power higher than or equal to the predetermined threshold value.

3. The laser processing apparatus of claim 2, further comprising a melting detector configured to detect melting of a surface of the workpiece,
   wherein the melting detector includes a light detector configured to detect an amount of reflected light reflected from the workpiece, and configured to detect melting of the surface of the workpiece based on a power of reflected light of the infrared laser light, irradiating the workpiece before the surface of the workpiece begins melting, having the power lower than the predetermined threshold value.

4. The laser processing apparatus of claim 3, wherein the melting detector includes a capture unit configured to image a surface of the workpiece, and to detect melting of the surface of the workpiece based on a captured image by the capture unit.

5. The laser processing apparatus of claim 1, wherein the output controller is further configured to cause the laser to:
   before the surface of the workpiece begins to melt, irradiate the workpiece with the infrared laser light having a power lower than a predetermined threshold value in addition to irradiating the workpiece with the blue laser light,
   after the surface of the workpiece begins to melt, irradiate the workpiece with the blue laser light in addition to irradiating the workpiece with the infrared laser light having a power higher than or equal to the predetermined threshold value, and
   increase or decrease a power of the blue laser light after the surface of the workpiece has begun to melt, depending on a state of the surface melting.

6. The laser processing apparatus of claim 1, wherein the output controller is further configured to set a power of the infrared laser light at zero before the surface of the workpiece begins melting.

7. A laser processing method comprising:
   irradiating a workpiece with blue laser light; and
   irradiating the workpiece with infrared laser light,
   wherein the irradiating of the workpiece is performed by using the laser processing apparatus of claim 1.

8. The laser processing method of claim 7,
   wherein the workpiece is irradiated with blue laser light at an initial processing stage to initiate a surface melting of the workpiece; and
   wherein, after the surface melting has started, the workpiece is irradiated with infrared laser light having a power higher than a power of infrared laser light before the start of the surface melting.

9. The laser processing method of claim 8, wherein, during the initial processing stage, the workpiece is irradiated with infrared laser light having a power lower than a predetermined threshold value in addition to the blue laser light, wherein the start of the surface melting is detected based on reflected light of the infrared laser light having the power lower than the predetermined threshold value from the workpiece, and wherein the irradiating of the workpiece with the infrared laser light after the start of the surface melting comprises irradiating of the workpiece with the infrared laser light having a power higher than or equal to the predetermined threshold value.

10. The laser processing method of claim 8, wherein, during the initial processing stage, the workpiece is irradiated with infrared laser light in addition to the blue laser light, and, after the start of the surface melting, the workpiece is irradiated with blue laser light in addition to the infrared laser light, and wherein a power of the blue laser light with which the workpiece is irradiated after the start of the surface melting is controlled to increase or decrease depending on a state of the surface melting.

11. The laser processing method of claim 8, wherein the infrared laser light has a power of zero before the start of the surface melting.

\*  \*  \*  \*  \*